(12) United States Patent
Steeves et al.

(10) Patent No.: US 6,565,062 B2
(45) Date of Patent: May 20, 2003

(54) APPARATUS FOR THE SPLITTING OF CAST CONCRETE DUAL BLOCKS

(75) Inventors: Terry P. Steeves, St Agatha (CA); Douglas F. Silk, Whitby (CA)

(73) Assignee: Hengestone Holdings, Inc., Ontario (CA)

( * ) Notice: Subject to any disclaimer, the term of this patent is extended or adjusted under 35 U.S.C. 154(b) by 0 days.

(21) Appl. No.: 09/800,222

(22) Filed: Mar. 5, 2001

(65) Prior Publication Data

US 2001/0034980 A1 Nov. 1, 2001

Related U.S. Application Data

(62) Division of application No. 09/229,288, filed on Jan. 13, 1999, now Pat. No. 6,226,954.

(30) Foreign Application Priority Data

Jan. 29, 1998 (CA) .......................................... 2225292

(51) Int. Cl.[7] .......................... B29C 43/02; B28B 3/02
(52) U.S. Cl. ...................... 249/52; 425/412; 249/117
(58) Field of Search ............................ 425/412, 413, 425/422, 441, 444, 346; 249/52, 117, 119; 264/333, 336

(56) References Cited

U.S. PATENT DOCUMENTS

| | | | | |
|---|---|---|---|---|
| 3,679,340 A | * | 7/1972 | Springs | ....................... 425/444 |
| 3,955,907 A | * | 5/1976 | Yamasita et al. | ........... 425/260 |
| 4,098,865 A | * | 7/1978 | Repasky | ....................... 264/333 |
| 4,335,549 A | * | 6/1982 | Dean, Jr. | ......................... 52/98 |
| 5,249,950 A | * | 10/1993 | Woolford | ....................... 425/412 |
| 5,484,236 A | * | 1/1996 | Gravier | ....................... 52/592.6 |
| 6,029,943 A | * | 2/2000 | Sievert | ......................... 249/52 |
| 6,322,742 B1 | * | 11/2001 | Bott | ............................. 264/333 |

* cited by examiner

Primary Examiner—Robert Davis
Assistant Examiner—Thu Khanh T. Nguyen
(74) Attorney, Agent, or Firm—Wolf, Greenfield & Sacks, P.C.

(57) ABSTRACT

The present invention is directed to a process for manufacturing concrete dual blocks where the concrete block is separated into two individual blocks during the manufacturing process without an additional separating step after curing. The process comprises the steps of creating a mould cavity with a pull plate forming a bottom surface where the pull plate has an upper concave surface sloping outwardly and upwardly along its length from a separation line at the center of the upper surface of the pull plate, the separation line extending along the width of the plate, filling the mould cavity with wet concrete, compressing the concrete in the mould cavity with a tamper head having a lower convex surface corresponding to the upper surface of the pull plate, removing the pull plate, removing the mould and then the tamper head wherein the block has an upper and lower surface sloping outwardly and upwardly from the separation line at the center of each of the upper and lower surfaces towards its outer edge along its length and having v-shaped separation grooves at the separation lines; and allowing the block to settle on a flat pallet where it will split at the separation grooves into two individual blocks without the need for a separate manufacturing step after curing.

8 Claims, 4 Drawing Sheets

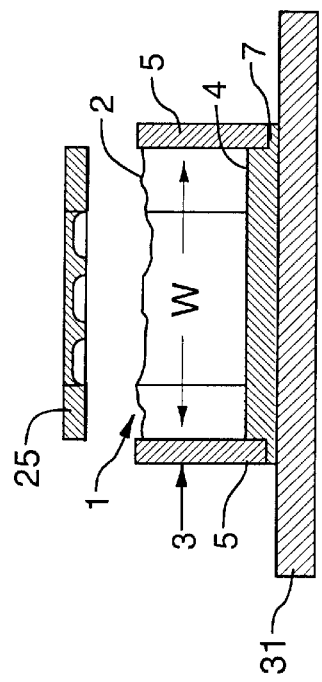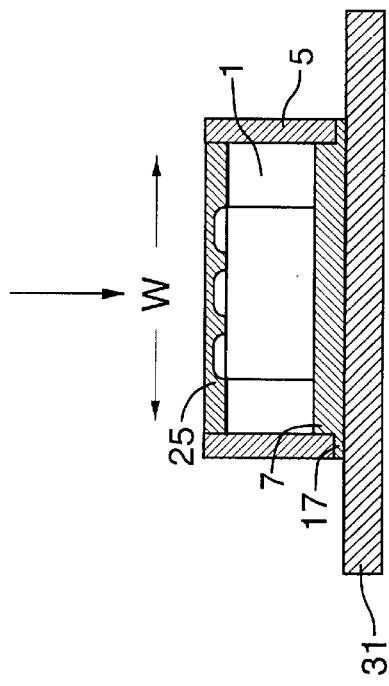
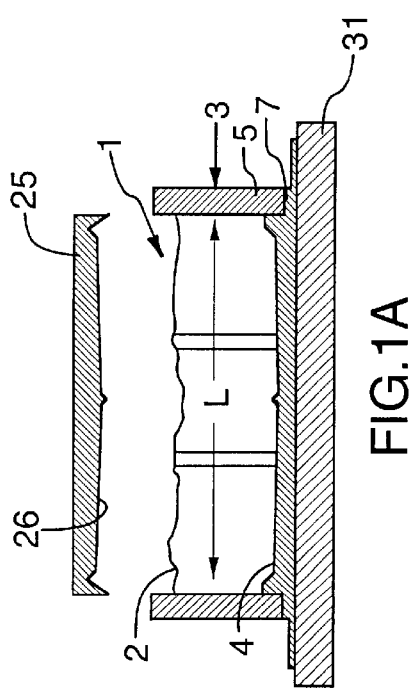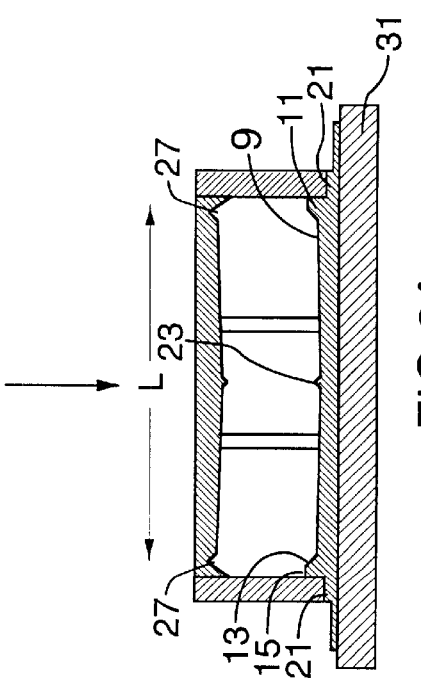
FIG. 1A  FIG. 2A
FIG. 1B  FIG. 2B

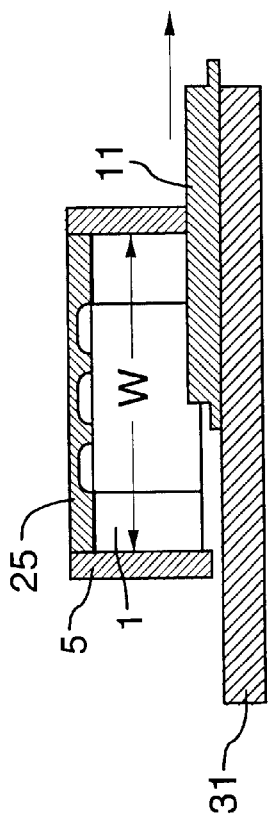
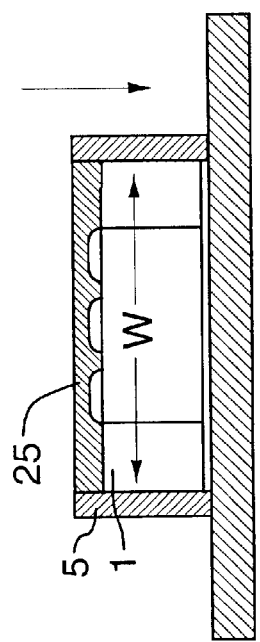
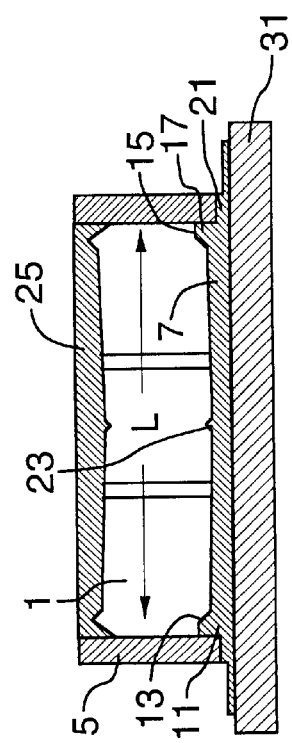
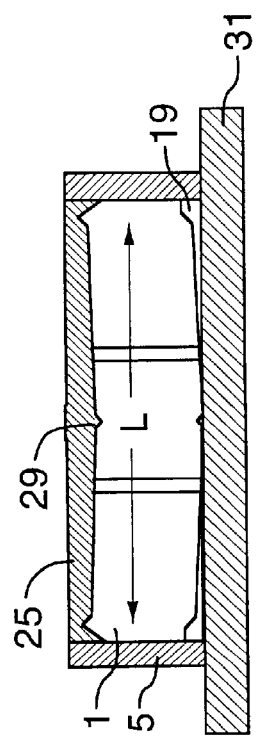

APPARATUS FOR THE SPLITTING OF CAST CONCRETE DUAL BLOCKS

This is a Divisional of prior application Ser. No. 09/229,285, filed on Jan. 13, 1999, entitled PROCESS AND APPARATUS FOR THE SPLITTING OF CAST CONCRETE DUAL BLOCKS, and now U.S. Pat. No. 6,226,954.

FIELD OF THE INVENTION

The present invention relates to the field of concrete blocksand, in particular, to a process for splitting dual blocks and an apparatus used in the process.

BACKGROUND OF THE INVENTION

Cast concrete blocks are well known in the construction industry. They have a wide range of uses including constructing retaining and other walls, paving stones, edge restraints, base material, interlocking blocks, masonry products, and barriers. The interlocking blocks are advantageous for use since mortar is not needed to hold the blocks in place and strengthen the wall. The blocks are preferably cast as a dual block so that each cast block can be split into two individual blocks. This process increases the efficiency of the manufacturing process and gives an aesthetically desirable irregular or natural looking surface to the block face.

The manufacturing process includes at least one manufacturing step to cast the dual block and a separate manufacturing step to split the dual block into its individual blocks. U.S. Pat. No. 5,017,049 issuing May 21, 1991 to Sievert describes a masonry block and its construction. Sievert outlines a process where the block is formed in a mould, the block is cured, and then the block is split into its two component blocks The block is split using a manual chisel and hammer or with a machine designed for this purpose. U.S. Pat. No. 5,598,679 issuing Feb. 4, 1997 to Orton et al. describes a process for splitting a cast concrete block into three blocks. Again, the block is formed in a mould, cured and then split. The cured block is split into its component blocks by advancing splitting knives along the cutting grooves.

These known processes require a separate step in the manufacturing process, specialized machinery and result in increased handling of the blocks. This requirement results in additional costs to the manufacturer. There therefore is a need for a process for casting concrete blocks were dual blocks can be split into individual blocks without the need for additional machinery and an additional manufacturing step. There also is a need for a process for casting concrete blocks which is more economical and which reduces the handling of the blocks.

SUMMARY OF THE INVENTION

The present invention provides a process for the manufacture of dual blocks were the dual blocks are split into individual blocks before the block is cured.

The present invention also provides an economical process for the manufacture of concrete dual blocks which are split into separate units during the manufacturing process before curing without the need for an additional manufacturing step.

The present invention also provides for an apparatus used in the process of manufacturing of cast concrete blocks.

There therefore is provided a method for the casting of a concrete dual block comprising the steps of: compressing wet concrete into a block shape having a top surface and a bottom surface, each of said surfaces having a pair of opposite side edges, at least the bottom surface having a separation line extending along its width intermediate said side edges and said bottom surface being generally curved so that at least one of said side edges is at an elevation above said separation line; and allowing the compressed mixture to settle on a substantially flat surface; the difference between the elevation of said separation line and said at least one of said side edges being selected to force the block to split substantially along the separation line upon settling of the block.

In a further aspect of the present invention, there is provided a moulded dual block having a length L and a width W and comprising an upper face, lower face, opposing end faces having upper and lower edges, and a separation line extending along the width on said upper and lower faces intermediate said end faces of said dual block, each of said upper and lower faces comprising two surfaces extending from said separation line towards said end faces along said length.

In a further aspect of the present invention, there is also provided a mould for forming a dual block comprising a bottom plate having an upper face having opposing side edges, a separation line intermediate said side edges, and at least one of said side edges having an elevation above said separation line.

In a still further aspect of the present invention, there is provided an apparatus for forming a moulded dual block comprising: a mould including a bottom plate having an upper face having opposing side edges, an upper plate having a lower face having opposing side edges, a separation line intermediate said side edges of at least one of said upper face of said bottom plate and said lower face of said upper plate, and at least one of said side edges having an elevation above said separation line, said elevation of said side edges selected to force said dual block to split along said separation line when the dual block is allowed to settle on a flat surface; means for filling the mould with wet concrete; and means for releasing the dual block from the mould.

BRIEF DESCRIPTION OF THE DRAWINGS

Preferred embodiments of the present invention may be better understood with reference to the drawings in which:

FIG. 1 is a cross-sectional view of the dual block in the first step of the preferred embodiment of the process of the present invention where FIG. 1a is a front view and FIG. 1b is a side view.

FIG. 2 is a cross-sectional view of the dual block in the second step of the present process where FIG. 2a is a front view and FIG. 2b is a side view.

FIG. 3 is a cross-sectional view of the dual block in the third step of the present process where FIG. 3a is a front view and FIG. 3b is a side view.

FIG. 4 is a cross-sectional view of the dual block in the fourth step of the present process where FIG. 4a is a front view and FIG. 4b is a side view.

FIG. 5 is a cross-sectional view of the dual block in the fifth step of the present process where

FIG. 6 is a cross-sectional view of the dual block in the sixth step of the present process where

DETAILED DESCRIPTION

Figure 5B:
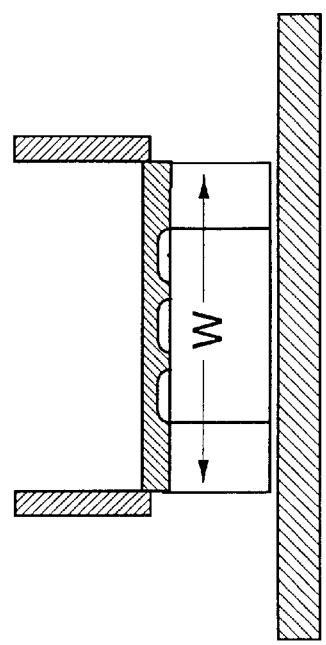
FIG. 5a is a front view and FIG. 5b is a side view.

The present invention is a process for the manufacture of a cast concrete dual block where the dual block 1 is separated into two construction blocks during the manufacturing process without an additional separating step after curing. The process of the present invention comprises the steps of filling the mould, compressing the concrete, removing the mould, and allowing the block to fracture.

Cast concrete dual blocks made by the process of the present invention utilize a mould 3. The mould 3 consists of a generally rectangular shaped area defined by four abutting walls 5. The mould cavity has a length L and a width W. The bottom wall of the mould 3 is comprised of a pull plate 7 having a generally rectangular shape corresponding to the shape of the mould 3. The pull plate 7 has an upper surface 9 which is generally concave in shape. The upper surface 9 has a curved v-shaped configuration, sloping upwardly and outwardly from a separation line at its centre towards each end along its length L. The separation line extends across the width of the pull plate 7. The two ends of the plate 7 are elevated approximately six millimeters above its separation line. However, other elevations may be used to achieve the separation of the dual block according to the present invention. At the outer edge of the pull plate 7, the plate 7 has a raised portion 11 extending along its width W. The raised portion 11 has an inner edge 13 which slopes away from the centre of the plate 7 and a generally flat upper surface 15. The outer edge 17 is flat, lying parallel to the walls 5 of the mould 3. This raised portion 11 creates a recess 19 in the lower surface of the block for allowing the block to engage corresponding lips in abutting blocks when the blocks are used to form a retaining wall or other structure. As is obvious to a skilled person, the raised portion 11 is optional depending upon the final use for the blocks and various configurations may be incorporated. The pull plate 7 has thin flat tabs 21 extending outwardly from the outer lower edges of the pull plate 7 for receiving the lower edges of the mould walls 5 in a temporary rabbet joint. At the separation line at the centre of the plate 7, the plate 7 forms an inverted v-shaped extrusion 23 extending along its width W between the front and rear faces.

The top wall of the mould 3 is formed by a tamper head 25. It has a generally rectangular shape corresponding to the shape of the mould 3. The lower surface 26 of the tamper head 25 is generally convexly shaped, sloping outwardly and upwardly from a separation line at its centre towards each end along its length L. The separation line extends across the width of the tamper head 25. At the end faces, there is a groove 27. This groove may extend continuously along its width or may consist of a series of recesses. Further, at the separation line at its centre, the tamper head forms a v shaped extrusion 29 extending along its width W.

Figure 6B:
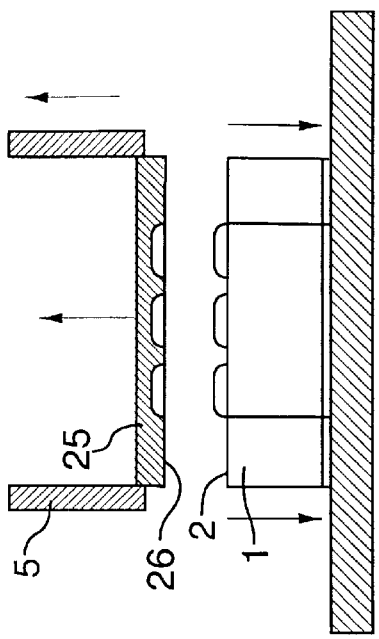
FIG. 6a is a front view and FIG. 6b is a side view.
Figure 5A:
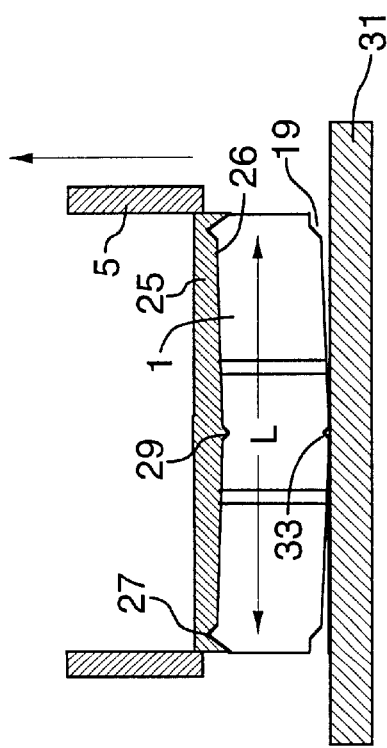
Figure 6A:
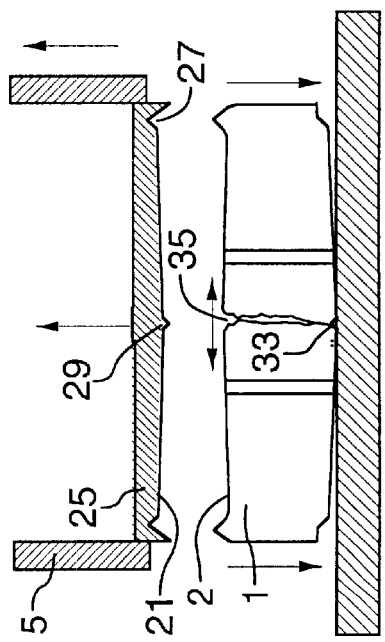

To form a concrete dual block 1, the pull plate 7 is placed on a production pallet 31. The mould 3 is lowered onto and rests on the outer tabs 21 of the pull plate 7 forming a cavity. In the first step of the process, shown in FIG. 1, the cavity of the mould 3 is filled with wet concrete. The concrete is then compressed, as shown in FIG. 2, by lowering the tamper head 25 onto the top surface of the concrete to compress it thereby forming a concrete block 1 in the mould cavity. The pull plate 7 is removed by sliding it along the width W of the mould 3 leaving the block 1 and mould 3 suspended above the production pallet 31 as shown in FIG. 3. In FIG. 4, the mould 3 and block 1 are lowered onto the production pallet 31. Alternatively, the production pallet may be raised to the level of the mould. In FIG. 5, the mould 3 is removed from the block 1 by lifting it upwards past the tamper head 25. The tamper head 25 remains in place until the mould 3 is lifted past the tamper head. Once the mould 3 is lifted past the tamper head 25, the tamper head 25 is also removed by lifting it upwards from the block 1 as shown in FIG. 6.

The block 1 remains on the production pallet. The lower surface 4 of the block 1 has a generally convex or broad v shape corresponding to the shape of the upper surface 9 of the pull plate 7. It therefore slopes upwardly and outwardly from its separation line at its center towards its outer edge along its length L. The block has a small inverted v-shaped separation groove 33 on its lower surface 4 at its separation line corresponding to the small inverted v-shaped extrusion on the upper surface 9 of the pull plate 7. Further, the upper surface 2 of the block 1 corresponds to the shape of the lower surface 26 of the tamper head 25. It is generally concavely shaped sloping upwardly from its separation line towards its outer edge along its length L. It has a v-shaped separation groove 35 in its upper surface 2 corresponding to the v-shaped extrusion on the lower surface 26 of the tamper head 25. When the tamper head 25 is removed from the block 1, the block 1 remains on the production pallet 31. Because of its sloping lower surface 4 and the v-shaped separation grooves 33, 35 at the center of the upper and lower surfaces 2, 4, the block 1 will settle onto the production pallet 31 splitting along its separation line forming two blocks. The two blocks may then be cured in any known manner.

As will be obvious to a person skilled in the art, the mould may be of any desired shape. The pull plate and tamper head would be formed with corresponding shapes. The mould, pull plate, and tamper head may include projections and grooves for forming interlocking blocks or blocks having other desired features. The mould may also be designed to allow the blocks to be formed with decorative features on any of its faces. Further, the block may be formed to split at a separation line which is not at the centre of the block but may be offset towards one end of the block.

Figure 7:
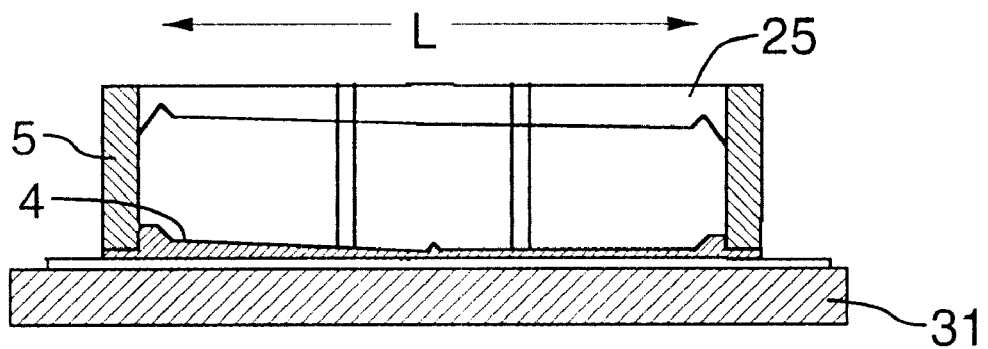
FIG. 7 is a cross-sectional front view of the dual block in the compression cycle (see FIG. 2) using an alternative embodiment of the present invention.

The process of the present invention also includes forming a dual block where only one side of the upper and lower surface of the dual block is sloped as shown in FIG. 7. The dual block will split along its width at the separation line at the beginning of the sloped area. The block may also have only its lower surface with a sloping side from its separation line.

The block formed by the present process is not fully cured. If the dual block is allowed to cure for a length of time, the dual block may only partially split when the mould is removed and the dual block settles onto the production pallet. However, the bond between the blocks 1a, 1b is so weakened that normal handling procedures cause the units to split into individual blocks.

The present invention is described by reference to preferred embodiments. However, variations of the invention will be obvious to persons skilled in the art and may be made without departing from the spirit or scope of the invention.

Embodiments of the present invention in which an exclusive property or privilege are claimed are as follows:

1. A mould for forming a dual block comprising a bottom plate having an upper face having opposing side edges, a separation line in said upper face of the bottom plate intermediate said side edges, and at least one of said side edges having an elevation above said separation line and a wall extending upwardly from each side.

2. The mould of claim 1 further comprising an upper plate having a lower face having side edges, a separation line in said lower face of the upper plate intermediate said side edges, and at least one of said side edges having an elevation above said separation line, the elevation of said at least one of said side edges of said upper plate corresponding to the elevation of said at least one of said side edges of said bottom plate.

3. The mould of claim 1 or 2 further including an elongated protrusion extending along said separation line in at least one of said upper face of said bottom plate and said lower face of said upper plate for forming a separation groove in the moulded dual block.

4. The mould of claim 1 wherein said separation line is at the centre between said opposing side edges.

5. The mould of claim 1 wherein said side edges of said bottom plate further include raised projections for forming indentations in the moulded dual block.

6. The mould of claim 1 wherein said side edges of said upper plate further include indentations for forming projections from the moulded dual block for engaging said indentations formed in the moulded block from said projections at said side edges of said upper face of said bottom plate.

7. An apparatus for forming a moulded dual block comprising:

a mould including a bottom plate having an upper face having opposing side edges, an upper plate having a lower face having opposing side edges, a separation line intermediate said side edges of said upper face of said bottom plate and said lower face of said upper plate, and at least one of said side edges of said bottom plate having an elevation above said separation line, said elevation of said side edges selected to force said dual block to split along said separation line when the dual block is allowed to settle on a flat surface; means for filling the mould with wet concrete; and means for releasing the dual block from the mould.

8. The apparatus of claim 7 wherein said side edges of said upper face of said bottom plate are elevated above said separation line on said bottom plate and said side edges of said lower face of said upper plate are elevated above said separation line of said upper plate.

* * * * *